A. S. CUBITT.
ELECTRIC WATER HEATER.
APPLICATION FILED NOV. 10, 1910.

Patented Mar. 5, 1912.

Witnesses:
George H. Tilden
J. Ellis Eden

Inventor:
Archibald S. Cubitt,
by Albert G. Davis
His Attorney.

UNITED STATES PATENT OFFICE.

ARCHIBALD S. CUBITT, OF PITTSFIELD, MASSACHUSETTS, ASSIGNOR TO GENERAL ELECTRIC COMPANY, A CORPORATION OF NEW YORK.

ELECTRIC WATER-HEATER.

1,019,427.  Specification of Letters Patent.  Patented Mar. 5, 1912.

Application filed November 10, 1910. Serial No. 591,632.

*To all whom it may concern:*

Be it known that I, ARCHIBALD S. CUBITT, a subject of the King of Great Britain, residing at Pittsfield, county of Berkshire, State of Massachusetts, have invented certain new and useful Improvements in Electric Water-Heaters, of which the following is a specification.

This invention relates to electric fluid heaters and the like and has for its object the provision of a device of this character in which the fluid can be brought up to the desired temperature quickly and efficiently.

One of the objects of my invention is to produce an electric fluid heater in which a relatively small portion of the water is heated quickly while a larger portion is heated slowly.

Another object of my invention is to produce an electric water heater of this character in which the temperature of the water which is heated quickly is regulated automatically and any excess of heated water is transmitted to the larger body of water.

In carrying out my invention I provide a heating chamber and a storage chamber. The two chambers are so connected that a passage between them is automatically controlled by the temperature of the water. In carrying this into effect in one form, a valve is provided between the two chambers and a thermostat is provided for controlling the valve. The parts are so arranged that when this valve is opened a circulation of water is established from one chamber to the other. I also provide means whereby when the circulation does take place the colder water in the storage chamber is caused to flow into the heating chamber. This I accomplish by having a pipe extending into the storage chamber which is provided with means whereby it automatically adjusts its effective length to the height of the water.

Other objects and purposes of my invention will appear in the course of the following specification in which I have disclosed my invention embodied in concrete form for purposes of illustration.

Figure 1:
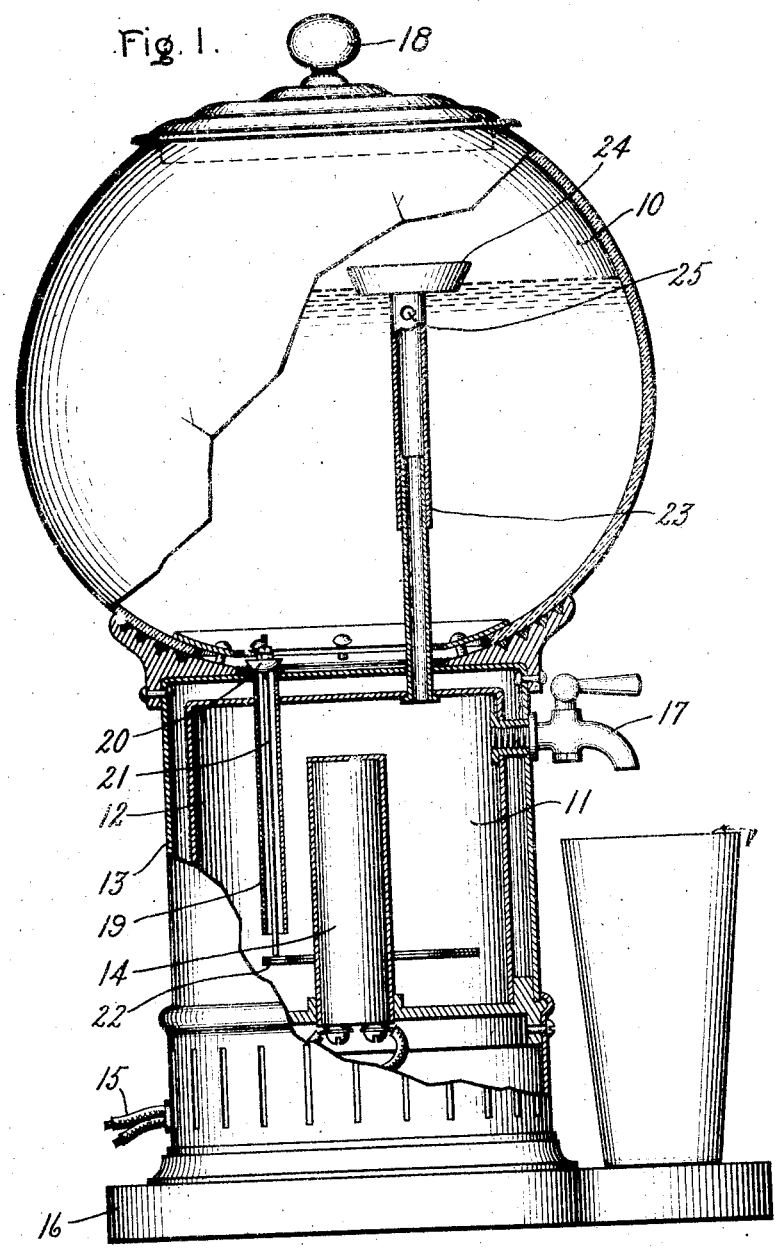
Figure 2:
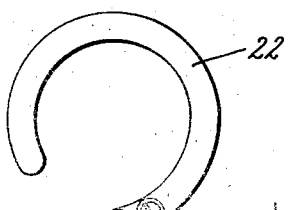

In the accompanying drawing embodying my invention in one form, Figure 1 represents a side elevation of my device, the casing being partly broken away to disclose the interior structure; and Fig. 2 is a detail view of the thermostat.

Referring to the drawings, 10 represents the storage chamber and 11 represents the heating chamber. The heating chamber I have shown as being heat insulated. This may be done as shown in the drawings by providing an inner casing 12 and an outer casing 13. The space between these casings may be heat insulated in any well-known manner, as, for instance, by evacuating the space. In the bottom of the heating chamber I have provided a heating unit 14 which extends vertically upward. The terminals 15 of this heating unit are brought out through the base 16 which is secured to the bottom of the heating chamber. A faucet 17 communicates with the interior of the heating chamber for drawing off the water from this chamber.

The storage chamber 10 may be in any desired form, as, for instance, a globe having a cover 18. This globe is secured to the top of the heating chamber, being open at the bottom so as to provide communication with the lower chamber. In order to provide a passage between the two chambers I arrange a pipe 19, the upper end of which communicates with the storage chamber while the bottom extends downward into the heating chamber. A valve 20 is provided for the top of this pipe and the rod 21 for operating this valve extends down through and beyond the end of the pipe. The end of this rod engages a thermostatic element 22 supported in any desired manner not shown which may be shaped as shown in Fig. 2. This thermostatic element is so arranged that as the temperature varies its end which engages the valve operating rod is moved up and down and thereby opens and closes the valve 20. In order to facilitate the circulation of the water from one chamber to another, I provide the circulating pipe 23. While the circulation is going on between the two chambers the colder water will be at the top of the storage chamber. In order to bring this cool water down into the heating chamber, the circulating pipe is made extensible, this being shown in the drawing by having the pipe made in telescoping sections. At the top of the upper section of the pipe I provide a float 24 which will move up and down with the level of the water and thereby keep the passage 25 in the circulating pipe at or near the top of the water.

The operation of my device constructed as above described is as follows: When the unit 14 is heated the water in the chamber 11 will be correspondingly heated, while the temperature of the water in the upper tank will be unchanged. When the water in the lower chamber reaches a predetermined temperature the valve 20 will open and the water will circulate from the lower chamber into the upper chamber. At the same time the water which leaves the lower chamber will be displaced by water from the top of the storage chamber. In this way the circulation is carried on until the temperature of the water in the lower chamber is reduced to the proper point. The water in the upper chamber is therefore gradually raised in temperature, while that in the lower chamber is kept at a substantially constant temperature. The hot water in the lower chamber can be drawn off at any time through the faucet 17.

While I have described my invention as embodied in concrete form for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. An electric water heater comprising a heating chamber, a storage chamber, a thermostat, and means controlled thereby for establishing circulation between said chambers.

2. An electric water heater comprising a heating chamber, a storage chamber, a thermostat located in the heating chamber, and means controlled thereby for establishing circulation between said chambers.

3. An electric water heater comprising a heating chamber, a storage chamber, a thermostat, and a valve between said chambers controlled by the thermostat.

4. An electric water heater comprising a heating chamber, a storage chamber, a thermostat located in the heating chamber, and a valve between said chambers controlled by the thermostat.

5. An electric water heater comprising a heating chamber, a storage chamber, a pipe extending from one chamber into the other, and means whereby the effective length of said pipe varies with the height of the water in the chamber into which it extends.

6. An electric water heater comprising a heating chamber, a storage chamber located above said heating chamber, a pipe extending upward into said storage chamber, and a float at the upper end of said pipe for causing the effective length of the pipe to vary with the height of the water in the storage chamber.

7. An electric water heater comprising a heating chamber, a storage chamber, means controlled by the temperature of the water for establishing a passage between said chambers, a pipe extending from one chamber into the other, and means whereby the effective length of said pipe is caused to vary with the height of the water.

In witness whereof, I have hereunto set my hand this 7th day of Nov., 1910.

ARCHIBALD S. CUBITT.

Witnesses:
FREDERICK M. VOGEL,
BERTRAM GUISE.